Oct. 24, 1939.  R. N. HAYS  2,177,178
POUR SPOUT BUCKET FRICTION LID
Filed Aug. 22, 1938
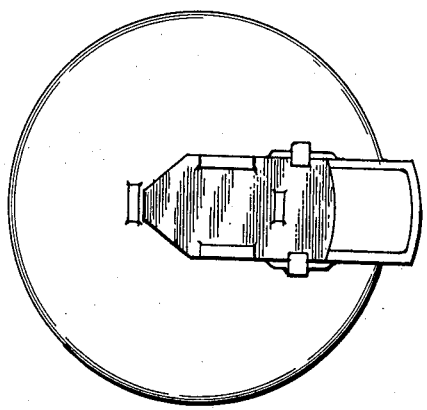
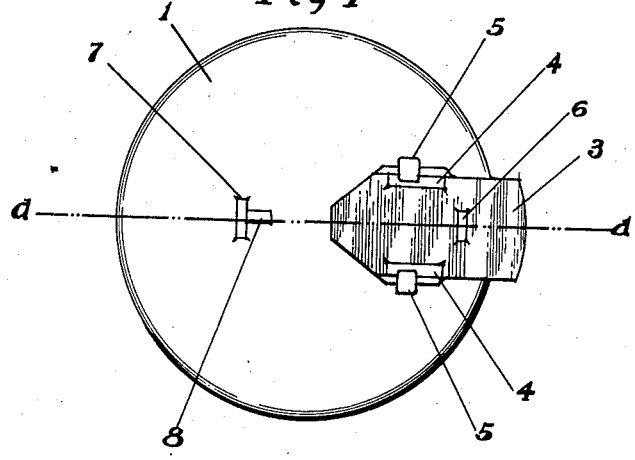
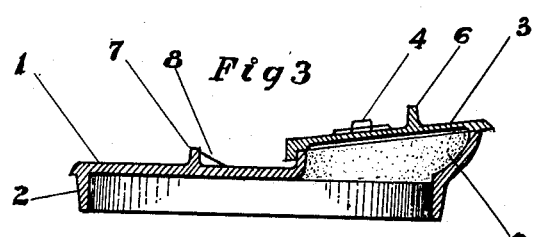
Reynold N. Hays
INVENTOR.
BY Chas. Denegre
ATTORNEYS.

Patented Oct. 24, 1939

2,177,178

UNITED STATES PATENT OFFICE 2,177,178

POUR SPOUT BUCKET FRICTION LID

Reynold N. Hays, Birmingham, Ala.

Application August 22, 1938, Serial No. 226,046

3 Claims. (Cl. 221—21)

This invention relates to improvement in a friction fitting lid having a convenient spout with slide cover, and disposed to fit into a standard type metal bucket generally used for syrup or other liquids. Another object of the spout-lid combination is the use of same on the class of bucket mentioned to provide kitchen containers for foods such as corn meal, grits, beans and the like; in other words anything that will pour through a spout.

In the accompanying drawing Fig. 1 is a plan view of lid and spout with spout closed; Fig. 2 is a plan view of lid and spout with spout cover open; Fig. 3 is a sectional view of Fig. 1 taken on line A—A.

Similar reference numerals refer to similar parts throughout the views.

By referring to the drawing it will be observed that 1 is a flat lid having a beveled flange 2. This flange is pressed by hand into the top rim of a bucket of the type mentioned heretofore. The spout 9 has a slidable cover 3 that is manipulated by hand fingers in contact with lug 6. The lid or cover 3 is provided with slide bearing shoulders 4 that are held in position by overlapping arms 5. When the spout cover 3, which is made of stiff material, is moved to open position its inner end strikes incline 8 that causes it to rise and jam against abutment 7. This avoids the necessity of holding the spout lid open while pouring from the container. The spout cover fits snugly but is movable by finger manipulation.

I reserve the right to manufacture the device out of any material that may be best suited for the purpose. Light metal such as aluminum is preferable.

While I have illustrated and described the preferred form and embodiment of my invention, I do not wish to limit myself to the exact and precise details of structure shown, but desire to avail myself of such variations and modifications as come within the spirit and scope of the appended claims.

Having described my invention I claim:

1. A friction fitting lid for a metal bucket, comprising; a round lid with a beveled flange, an opening as a spout in one edge of said lid, a slidable flat cover over said spout opening, said spout cover held in place by overlapping arms, said spout cover slidable towards the center from the outer edge of the lid and from the center to the outer edge, an inclined part integral with the main lid to raise the inner edge of said spout cover, an abutment for the inner end of said spout cover.

2. A removable friction lid for a metal bucket, comprising; a main flat lid having on one face adjacent its circumference a beveled flange, an oblong spout opening in one side of said lid, a slidable cover over said spout opening, bearing and retaining means to hold said spout cover in close proximity to the spout opening edges, an inclined abutment to raise and hold said spout cover in its open position.

3. A combination friction retaining bucket lid and pouring spout, comprising; a flat lid, a beveled flange, a slidable cover for said spout, means for retaining said spout cover in closed position and open position, means for raising the inner edge of said spout cover when in open position.

REYNOLD N. HAYS.